(12) United States Patent
Fontana et al.

(10) Patent No.: US 10,241,480 B2
(45) Date of Patent: Mar. 26, 2019

(54) CONFIGURATION OF REGULATING ELEMENTS IN A PARTITION OF A DISTRIBUTION NETWORK

(71) Applicants: International Business Machines Corporation, Armonk, NY (US); Nicola Fontana, Aversa (IT); Universita degli Studi di Napoli Federico II, Naples (IT)

(72) Inventors: Nicola Fontana, Aversa (IT); Maurizio Giugni, Naples (IT); Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 15/273,927

(22) Filed: Sep. 23, 2016

(65) Prior Publication Data

US 2018/0088601 A1   Mar. 29, 2018

(51) Int. Cl.
  *G05D 7/06*   (2006.01)
  *G05B 15/02*   (2006.01)
(52) U.S. Cl.
  CPC .................................... *G05B 15/02* (2013.01)
(58) Field of Classification Search
  CPC .............................. G05B 15/02; G05D 7/0676
  See application file for complete search history.

(56) References Cited

U.S. PATENT DOCUMENTS

| | | | | |
|---|---|---|---|---|
| 8,175,859 B1 * | 5/2012 | Wu | ........................ | G06Q 50/06 703/9 |
| 8,265,911 B1 * | 9/2012 | Wu | ........................... | E03B 1/00 703/6 |
| 8,958,922 B2 | 2/2015 | Blank et al. | | |
| 2004/0217654 A1 * | 11/2004 | Maturana | ................. | G05B 9/03 307/116 |
| 2008/0089248 A1 * | 4/2008 | Ushiyama | ........... | H04L 12/1854 370/256 |

(Continued)

FOREIGN PATENT DOCUMENTS

CN        103839190 A    6/2014

OTHER PUBLICATIONS

De Paola et al., "Optimal design of district metered areas in water distribution networks," 12th International Conference on Computing and Control for the Water Industry (CWI2013), Sep. 2013, 9 pages.

(Continued)

*Primary Examiner* — Kenneth M Lo
*Assistant Examiner* — Chad G Erdman
(74) *Attorney, Agent, or Firm* — Yee & Associates, P.C.; Isaac Gooshaw

(57) ABSTRACT

A method for configuring a distribution network of a commodity, wherein the determination of a setting of each inflow regulating element (according to at least one optimization criterion) is repeated for different versions of a working subset (defined by one or more of the parts having no outflow regulating element whose setting is still to be determined) until the settings of all the regulating elements have been determined. A further aspect provides a software program and a software program product for implementing the method. A further aspect provides a corresponding system.

13 Claims, 7 Drawing Sheets

(56) References Cited

U.S. PATENT DOCUMENTS

| | | | | |
|---|---|---|---|---|
| 2011/0290331 | A1* | 12/2011 | Burrows | E03B 7/02 |
| | | | | 137/14 |
| 2012/0029720 | A1* | 2/2012 | Cherian | H02J 13/00 |
| | | | | 700/297 |
| 2013/0289781 | A1* | 10/2013 | Kallesoe | F04D 13/14 |
| | | | | 700/282 |
| 2014/0219078 | A1* | 8/2014 | Dasgupta | H04L 45/08 |
| | | | | 370/219 |
| 2014/0332088 | A1* | 11/2014 | Senesh | E03B 1/02 |
| | | | | 137/14 |
| 2015/0339412 | A1 | 11/2015 | Vitaletti | |
| 2015/0346753 | A1* | 12/2015 | Gan | G06Q 50/06 |
| | | | | 700/295 |
| 2016/0005119 | A1 | 1/2016 | Vitaletti | |
| 2017/0070195 | A1* | 3/2017 | Arknæs-Pedersen | H04R 3/12 |
| 2018/0192324 | A1* | 7/2018 | Bernini | H04W 24/02 |

OTHER PUBLICATIONS

Di Nardo et al., "An Automated Tool for Smart Water Network Partitioning," Water Resources Management, vol. 27, No. 13, Oct. 2013, pp. 4493-4508.

Fontana et al., "Shortest path criterion for sampling design of water distribution networks," Urban Water Journal, vol. 12, No. 2, Feb. 2015, pp. 154-164.

* cited by examiner

CONFIGURATION OF REGULATING ELEMENTS IN A PARTITION OF A DISTRIBUTION NETWORK

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the data processing field. More specifically, this disclosure relates to the configuration of partitions of distribution networks.

Distribution networks are commonly used to distribute different commodities from sources to users thereof (for example, water). In this context, especially when the distribution networks are very large, it may be desirable to partition them into smaller sub-networks (known as parts) that are easier to manage. For example, a (large) Water Distribution Network (WDN) may be partitioned into parts known as District Metered Areas (DMAs), or simply districts. This facilitates the localization of losses in the (water) distribution network by monitoring a balance between an inflow and an outflow of each part, and it allows supplying each part at lower pressure (thereby saving energy for pumping the water and reducing the losses); particularly, the parts may be designed to comprise users with a similar difference of their elevation with respect to the elevation of corresponding sources, so as to allow supplying the parts at a pressure that is only slightly higher than a Minimum Service Pressure (MSP) required by their users.

For this purpose, a three-phase approach may be used; in this case, the partitioning process is divided into separate phases that are more tractable from a computational point of view. Particularly, in a first phase multiple (candidate) partitions are generated that are plausible (well-behaved) from a theoretical point of view for the distribution network, in a second phase the partitions are configured by interconnecting the parts thereof to make them feasible from a practical (hydraulic) point of view, and in a third phase the interconnections of the parts are optimized (and one of the partitions is then selected). An example of this three-phase partitioning process is described in US-A-2015/339412.

With reference in particular to the third (optimization) phase of the partitioning process, a challenging activity is the determination of a setting of each regulating element that is used to regulate a transfer of the water across the interconnections among the parts of each partition; for example, this requires optimizing the settings of Pressure Regulating Valves (PRVs), or simply regulating valves, that regulate a pressure of the water that is transferred among the parts to minimize losses and energy at the same time remaining compatible with the minimum service pressures required by the users.

However, the optimization of the regulating valves is a very complex activity; this is mainly due to its inherent difficulty, since the setting of each regulating valve propagates to the other regulating valves so that their dependencies are to be considered simultaneously.

For this purpose, it might be possible to attempt the application of heuristic techniques (for example, based on genetic algorithms). However, because of their own nature the heuristic techniques simply provide results that may not be verified for their quality (for example, in terms of optimality, accuracy and precision); therefore, the obtained results might be relatively poor.

On the other hand, it might be possible to attempt the application of general optimization methods (for example, based on a non-linear least squares analysis). However, the optimization of the regulating valves involves the specification of constraints on the water that is supplied to the users of the distribution network (for example, defined by the corresponding minimum service pressure); therefore, these constraints apply to dependent variables of the optimization method (i.e., a pressure of the water supplied to the users). Conversely, the common optimization methods only allow specifying constraints on independent variables thereof (i.e., the setting of the regulating valves in this case). Moreover, the optimization methods require repeated verifications of the settings of the regulating valves at intermediate stages of their iterative process (for example, by running corresponding simulations of the distribution network); however, these simulations may generate impossible results from a physical point of view (for example, with negative pressure of the water that is supplied to some users).

Other techniques are instead available in case of far simpler applications. For example, US-A-2011/0290331 discloses monitoring water supply characteristics in respect of regional supply networks (which are fed by a main supply conduit via respective pressure reducing valves at respective regional pressures) and processing the water supplied into the main supply conduit (from a mains water supply station) to ensure acceptable values of a parameter related to a property of the water (which parameter may be water pressure).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of using an iterative process wherein at each iteration only inflow regulating elements are taken into account.

Particularly, an aspect provides a method for configuring a distribution network of a commodity, wherein the determination of a setting of each inflow regulating element (according to at least one optimization criterion) is repeated for different versions of a working subset (defined by one or more of the parts having no outflow regulating element whose setting is still to be determined) until the settings of all the regulating elements have been determined.

A further aspect provides a software program and a software program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
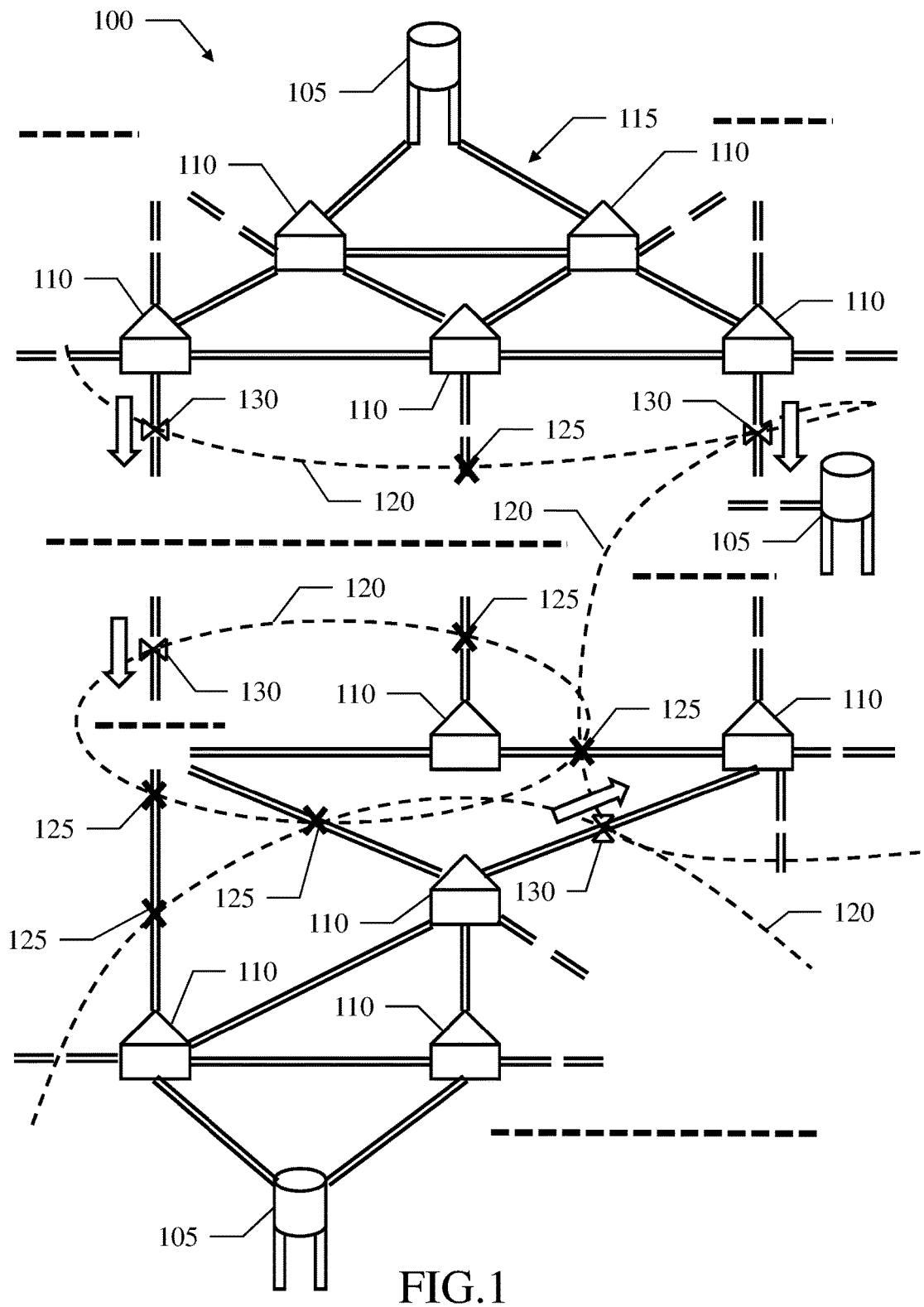
FIG. 1 shows a schematic representation of a water distribution network wherein the solution according to an embodiment of the present disclosure may be applied.

With reference in particular to FIG. 1, a schematic representation is shown of a water distribution network 100 wherein the solution according to an embodiment of the present disclosure may be applied.

The (water) distribution network 100 is a structure that is used to distribute water (for example, drinking water in urban areas). Particularly, one or more sources 105 supply the water to multiple users 110 for its consumption (such as of the order of some thousands); for example, the sources 105 are thanks or towers that collect and purify the water and then pressurize it (such as by pumps or gravity), whereas the users 110 are private houses that consume the water for domestic purposes. The sources 105 and the users 110 are interconnected by a pipe system 115 (for example, formed by a mesh of pipes and junctions) that transfers the water among them; generally, the pipe system 115 has a very complex structure (for example, with redundant interconnections to guarantee service continuity even in case of failures).

The network 100 is partitioned into two or more disjoint parts 120 (district metered areas or districts), each one comprising one or more interconnected sources 105, interconnected users 110 or interconnected sources 105 and users 110; the parts 120 are separated (hydraulically) by intercepting valves 125 and/or by regulating valves (or turbines) 130 arranged along the pipe system 115 at their boundaries. Particularly, each intercepting valve 125 closes a corresponding interconnection in the pipe system 115 between adjacent parts 120. Each regulating valve 130 instead regulates a transfer of the water from an (outflow) part 120 to another adjacent (inflow) part 120, as indicated by a corresponding arrow in the figure; therefore, the same regulating valve 130 is considered an outflow regulating valve 130 for its outflow part 120 (which delivers the water through it) and it is considered an inflow regulating valve 130 for its inflow part 120 (which receives the water through it).

With reference now to FIG. 2A-FIG. 2D, the general principles are shown of the solution according to an embodiment of the present disclosure.

Figure 2A:
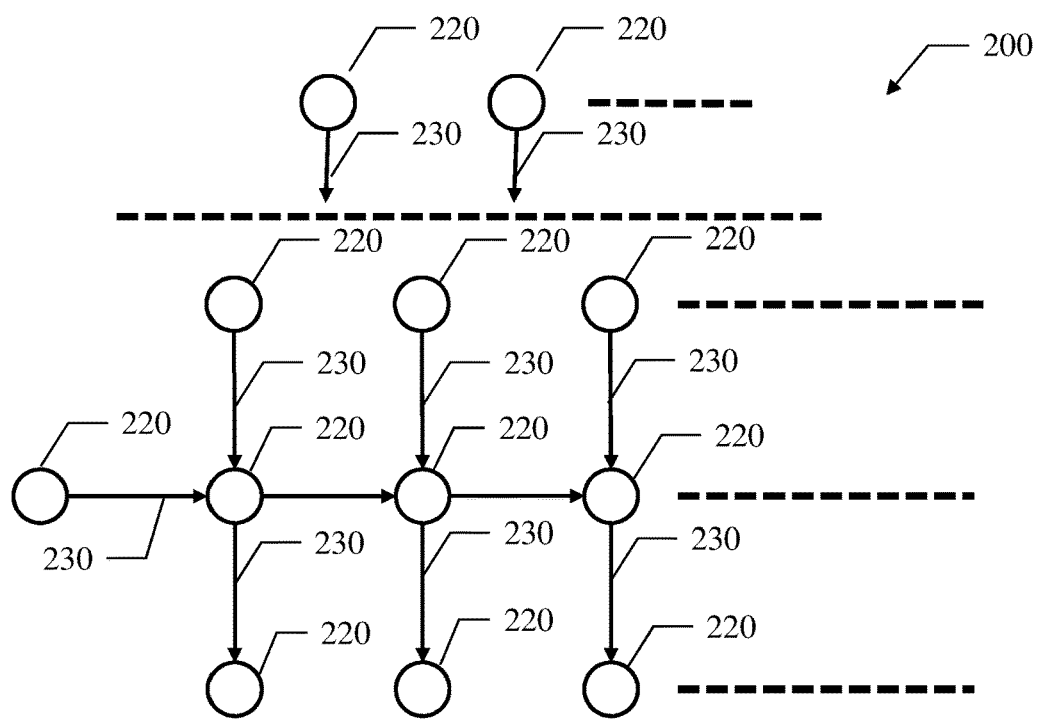
FIG. 2A, FIG. 2B, FIG. 2C, and FIG. 2D show the general principles of the solution according to an embodiment of the present disclosure.

Starting from FIG. 2A, in order to optimize the regulating valves of the distribution network (not shown in the figure), its partition may be represented by a model (i.e., an abstraction providing a simplified representation thereof) defined by artifacts corresponding to the parts and by relations among them corresponding to the regulating valves (wherein for each regulating valve the relation is that the outflow part transfers the water to the inflow part). For example, the partition of the distribution network may be represented by a directed graph 200. Particularly, the (directed) graph 200 comprises nodes (or vertexes) 220 representing the parts and arrows (or oriented edges, arcs) 230 representing the regulating valves; each arrow 230 is directed from the node 220 of its outflow part (defining a tail of the arrow 230 starting from it) to the node 220 if its inflow part (defining a head of the arrow 230 ending to it), to indicate that the water is transferred in the same direction.

In most practical situations, the regulating valves define a strict partial order relation among the parts, wherein for each regulating valve the outflow part precedes (<) the inflow part; this means that the relation of the regulating valves is defined for some of the parts only (and not for all of them), and that the relation is not reflexive (i.e., if a<b and b<a then a=b) and transitive (i.e., if a<b and b<c then a<c) and consequently it is asymmetric (i.e., if a<b then NOT b<a). Indeed, it is very unlikely (if not impossible if the partition of the distribution network has been properly defined) that a part delivers the water to another part and at the same time receives the water (directly or indirectly) from the same other part. In this case, the graph 200 is a Directed Acyclic Graph (DAG) with no (directed) cycles, i.e., the graph 200 has no path that loops back to a node 220 starting from the same node 220.

Figure 2B:
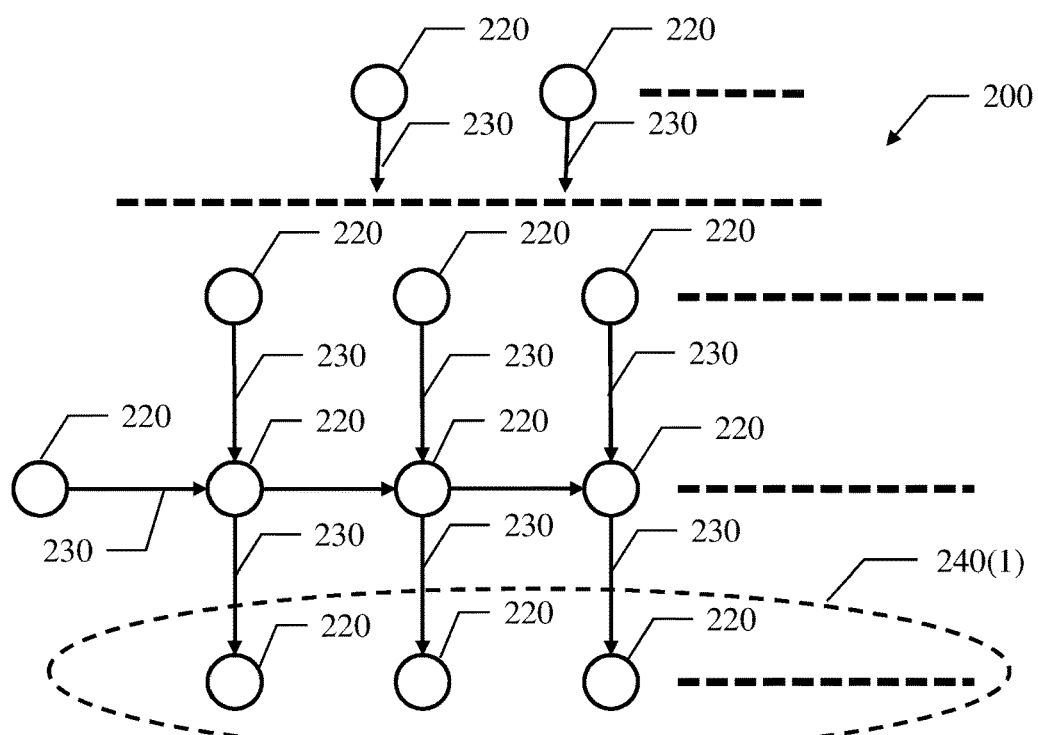

Moving to FIG. 2B, in this condition the distribution network always comprises (as a consequence of its strict partial order relation) one or more parts that do not have any outflow regulating valve (i.e., they do not deliver the water to any other part); a first version of a working subset of the parts is then identified as defined by these parts having no outflow regulating valve. The working subset of the parts is represented in the graph 200 by a corresponding working subset 240(1) of the nodes 220 that are not the tail of any arrow 230 starting from them.

The setting of each inflow regulating valve of the working subset (through which its parts receive the water from other parts of the distribution network) is determined according to one or more optimization criteria (for example, to supply the users of the working subset at a corresponding minimum service pressure required by them).

Figure 2C:
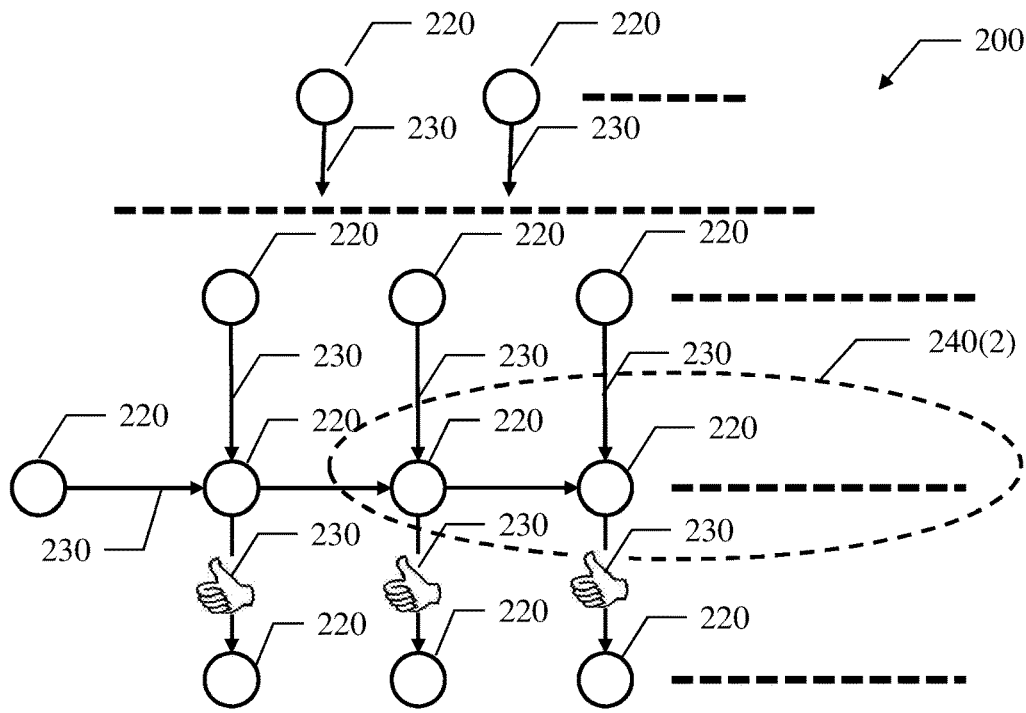

Moving to FIG. 2C, a next version of the working subset is identified; the working subset is now defined by one or more of the parts (that are not comprised in any previous version of the working subset), which have no outflow regulating valve whose setting is still to be determined (i.e., they deliver the water only to other parts of previous versions of the working subset); therefore, all the outflow regulating valves of these parts have their settings that have already been determined (as differentiated in the figure with the addition of a thumb-up symbol to the corresponding arrows 230). The working subset of the parts is represented in the graph 200 by a corresponding working subset 240(2) of the nodes 220 that are not the tail of any arrow 230 whose regulating valve has its setting that is still be to determined (i.e., the arrows 230 starting from them only end to nodes 220 of previous versions of the working subset, that is the first working subset 240(1) in this case). The setting of each inflow regulating valve of the working subset is then determined as above.

Figure 2D:
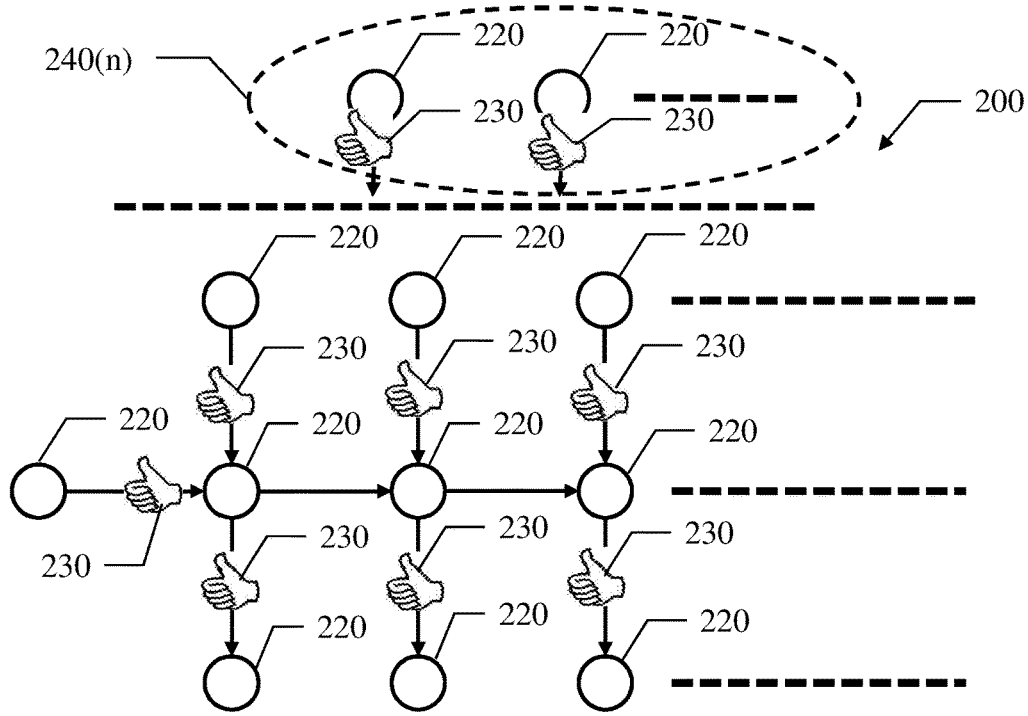

Moving to FIG. 2D, the same operations are repeated until the settings of all the regulating valves have been determined. This happens when a last version of the working subset is reached, wherein all its parts have no inflow regulating valve (i.e., they do not receive the water from any other part of the distribution network, since they contain sources capable of supplying them). This working subset of the parts is represented in the graph 200 by a corresponding working subset 240(n) of the nodes 220, wherein they are not the head of any arrow 230 ending to them.

The above described solution significantly simplifies the determination of the settings of the regulating valves. Indeed, at each iteration only the settings of the inflow regulating valves of the working subset have to be determined, because the working subset either does not have any outflow regulating valve (for its first version) or the settings of all the outflow regulating valves thereof have already been determined (for its next versions); therefore, the settings of the inflow regulating valves of the working subset have no effect on the parts of any previous version of the working subset (downstream along a direction of the transfer of the water among them). This provides a divide-and-conquer approach, wherein the whole determination of the settings of all the regulating valves is divided into separate phases (relating to the different working subsets) that are more tractable from a computational point of view.

Figure 3:
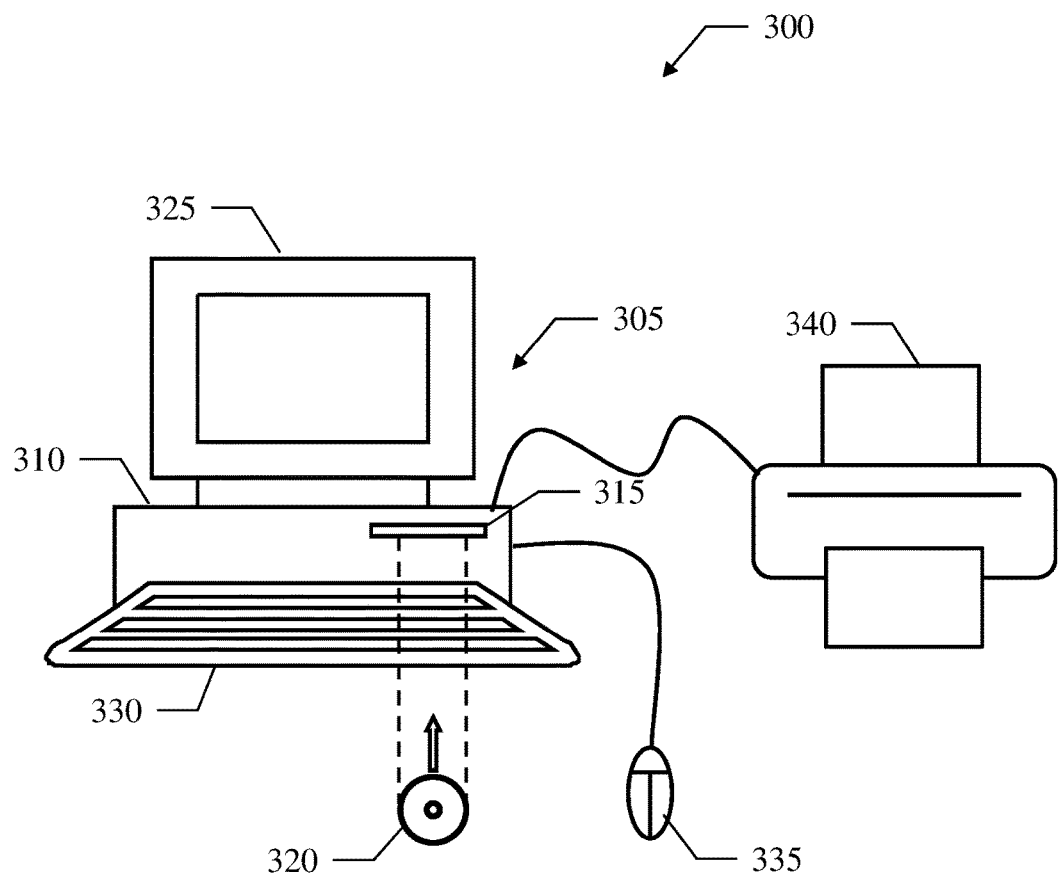
FIG. 3 shows a pictorial representation of a computing system that may be used to practice the solution according to an embodiment of the present disclosure.

With reference now to FIG. 3, a pictorial representation is shown of a computing system 300 that may be used to practice the solution according to an embodiment of the present disclosure.

The computing system 300 comprises a computing machine, or simply computer, 305 (for example, a PC). The computer 305 comprises a central unit 310, which houses the electronic circuits (not shown in the figure) controlling its operation. Particularly, these electronic circuits comprise a microprocessor, a working memory, drives for input/output units and a network adapter; typically, the electronic circuits are implemented by integrated components mounted on a mother board and on daughter boards plugged thereon. The computer 305 is also provided with a hard-disk (not shown in the figure) and a drive 315 for reading/writing removable storage devices 320 (for example, optical disks like DVDs). A monitor 325 is used to display images on a screen thereof. Operation of the computer 305 is controlled by means of a keyboard 330 and a mouse 335. The computing system 300 further comprises one or more peripherals that are coupled with the computer 305 in a conventional manner; for example, these peripherals comprise a printer 340 (for example, of the laser type).

Figure 4:
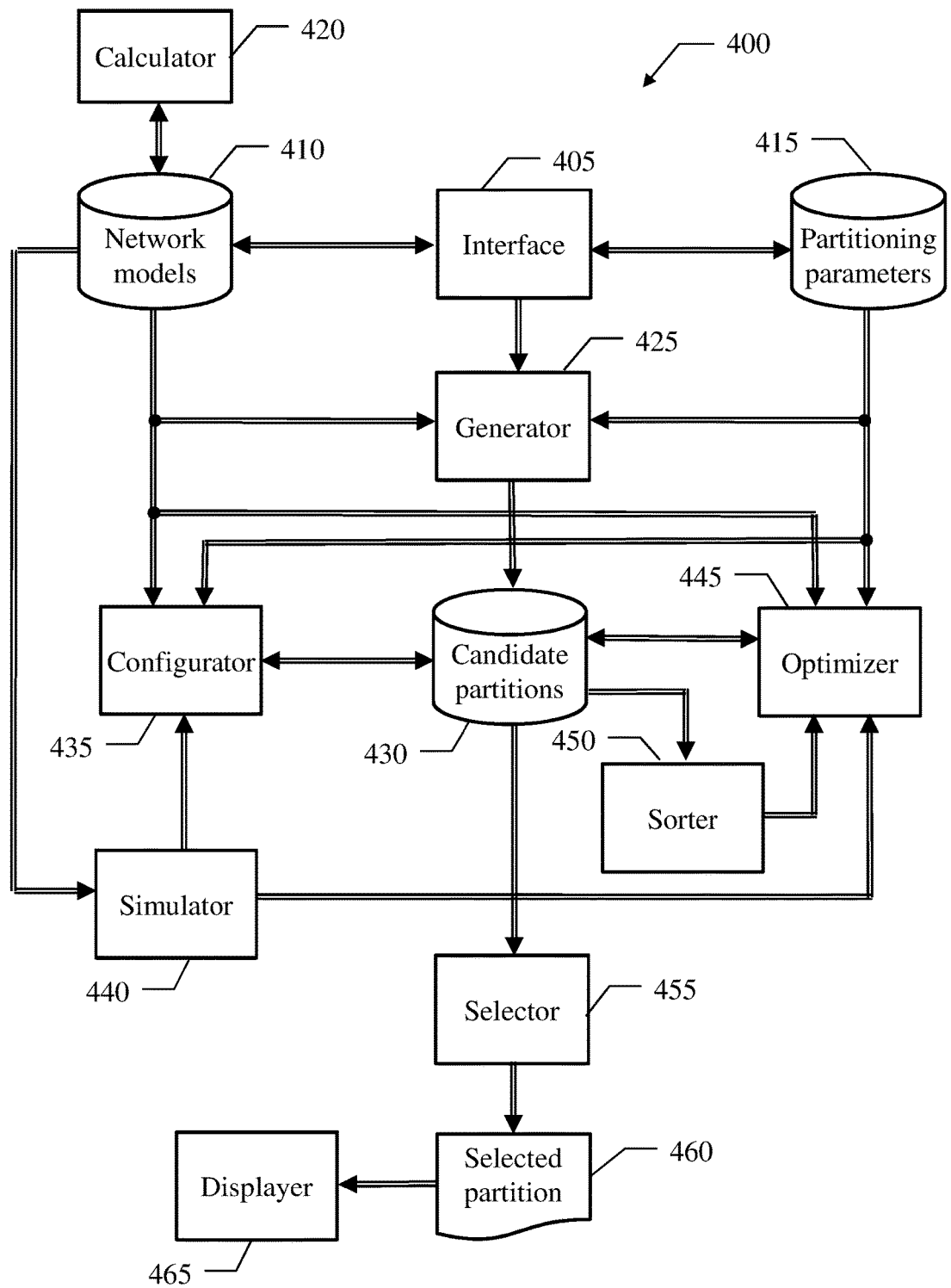
FIG. 4 shows the main software components that may be used to implement the solution according to an embodiment of the present disclosure.

With reference now to FIG. 4, the main software components are shown that may be used to implement the solution according to an embodiment of the present disclosure.

Particularly, all the software components (programs and data) are denoted as a whole with the reference 400. The software components are typically stored in the mass memory and loaded (at least partially) into the working memory of the computer when the programs are running, together with an operating system and other application programs (not shown in the figure). The programs are initially installed into the mass memory, for example, from removable storage units or from a network. In this respect, each program may be a module, segment or portion of code, which comprises one or more executable instructions for implementing the specified logical function.

A partitioner 400 implements a tool that assists an operator (for example, a hydraulic engineer) to partition distribution networks. As described in detail in the following, the partitioner 400 implements a three-phase partitioning process for each (selected) distribution network to be partitioned, wherein in a first (generation) phase multiple (candidate) partitions are generated, in a second (configuration) phase the partitions are configured, and in a third (optimization) phase the partitions are optimized (and one of them is then selected).

For this purpose, an interface 405 is used by the operator to enter information and/or commands. Particularly, the interface 405 controls (in read/write mode) a distribution network repository 410 storing a network model for each distribution network to be partitioned. The network model represents the distribution network with a graph, which comprises a node for each element defined by a single/concentrated source, user or junction (of the pipe system) and an edge for each pipe (of the pipe system). The network model further comprises one or more attributes for each source, user and pipe. For example, each source is qualified by its (output) pressure, elevation (from ground) and (maximum water supply) capacity, each user is qualified by its elevation, (average or maximum water supply) demand and minimum service pressure (MSP), either individually or globally for each distribution network, and each pipe is qualified by its (minimum) radius, length (for example, projected on a horizontal plane) and (average hydraulic) roughness. Moreover, the interface 405 controls (in read/write mode) a partitioning parameter repository 415 storing one or more partitioning parameters controlling the partitioning of the distribution networks, either individually or globally (for example, a number of the parts of each partition). A calculator 420 accesses (in read/write mode) the network model repository 410 for calculating further attributes of the sources, users and pipes of each network model (for example, head of the users and resistance of the pipes) and for updating it accordingly.

The interface 405 controls a generator 425, which implements the generation phase of the partitioning process for each distribution network (for generating the partitions thereof that are plausible from a theoretical point of view); for this purpose, the generator 425 accesses (in read mode only) the network model repository 410 and the partitioning parameter repository 415. The generator 425 saves a definition of a non-configured version of each partition of the distribution network, as defined by the users of each part thereof, into a (candidate) partition repository 430.

A configurator 435 accesses the network model repository 410 and the partitioning parameter repository 415 (in read mode only) and it accesses the candidate partition repository 430 (in read/write mode). The configurator 435 implements the configuration phase of the partitioning process for each distribution network (for configuring its partitions by interconnecting the parts thereof to make them feasible from a practical point of view). For this purpose, the configurator 435 leverages a simulator 440 (i.e., a hydraulic solver, for example, Epanet); the simulator 440 accesses (in read mode only) the network model repository 410 for running simulations of the corresponding distribution networks. The configurator 435 saves a definition of a configured version of each partition of the distribution network, as defined by the addition of the intercepting valves and the regulating valves associated with the pipes interconnecting its parts, into the candidate partition repository 430.

An optimizer 445 accesses the network model repository 410 and the partitioning parameter repository 415 (in read mode only) and it accesses the candidate partition repository 430 (in read/write mode). The optimizer 445 implements the optimization phase of the partitioning process for each distribution network (for optimizing its partitions by determining the settings of the corresponding regulating valves). For this purpose, the optimizer 445 leverages the simulator 440 and a sorter 450; the sorter 450 accesses (in read mode only) the candidate partition repository 430 for sorting the parts of each partition according to the corresponding partial order relation. The optimizer 445 saves a definition of an optimized version of each partition of the distribution network, as defined by the addition of the settings of its regulating valves, into the candidate partition repository 430.

A selector 455 accesses (in read mode only) the candidate partition repository 430. The selector 455 selects one of the partitions of each distribution network, and it saves the definition of the selected partition into a selected partition repository 460.

A displayer 465 accesses (in read mode only) the selected partition repository 460 for outputting a representation of the selected partition of each distribution network (for example, on the monitor).

Figure 5A:
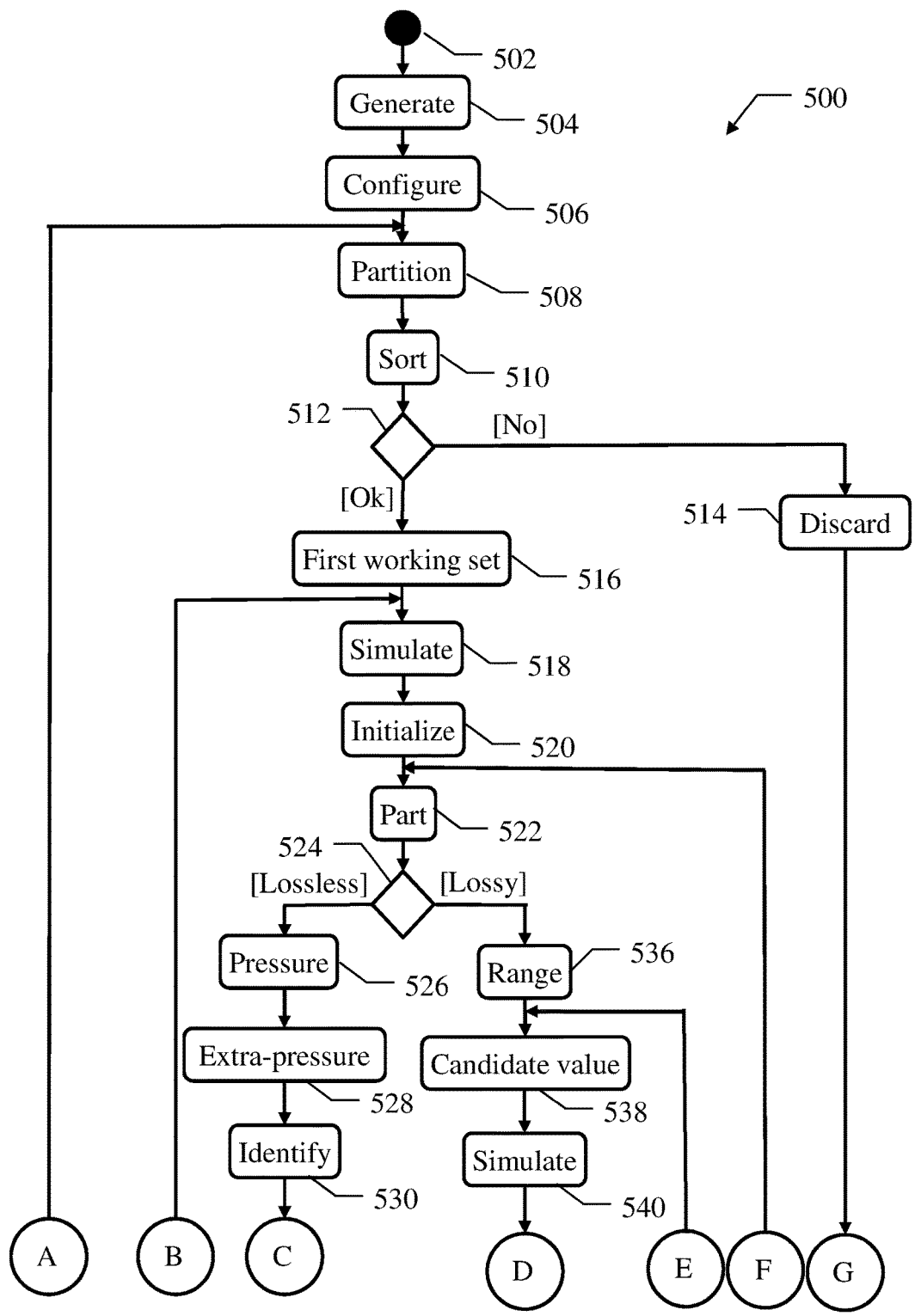
FIG. 5A and FIG. 5B show an activity diagram describing the flow of activities relating to an implementation of the solution according to an embodiment of the present disclosure.
Figure 5B:
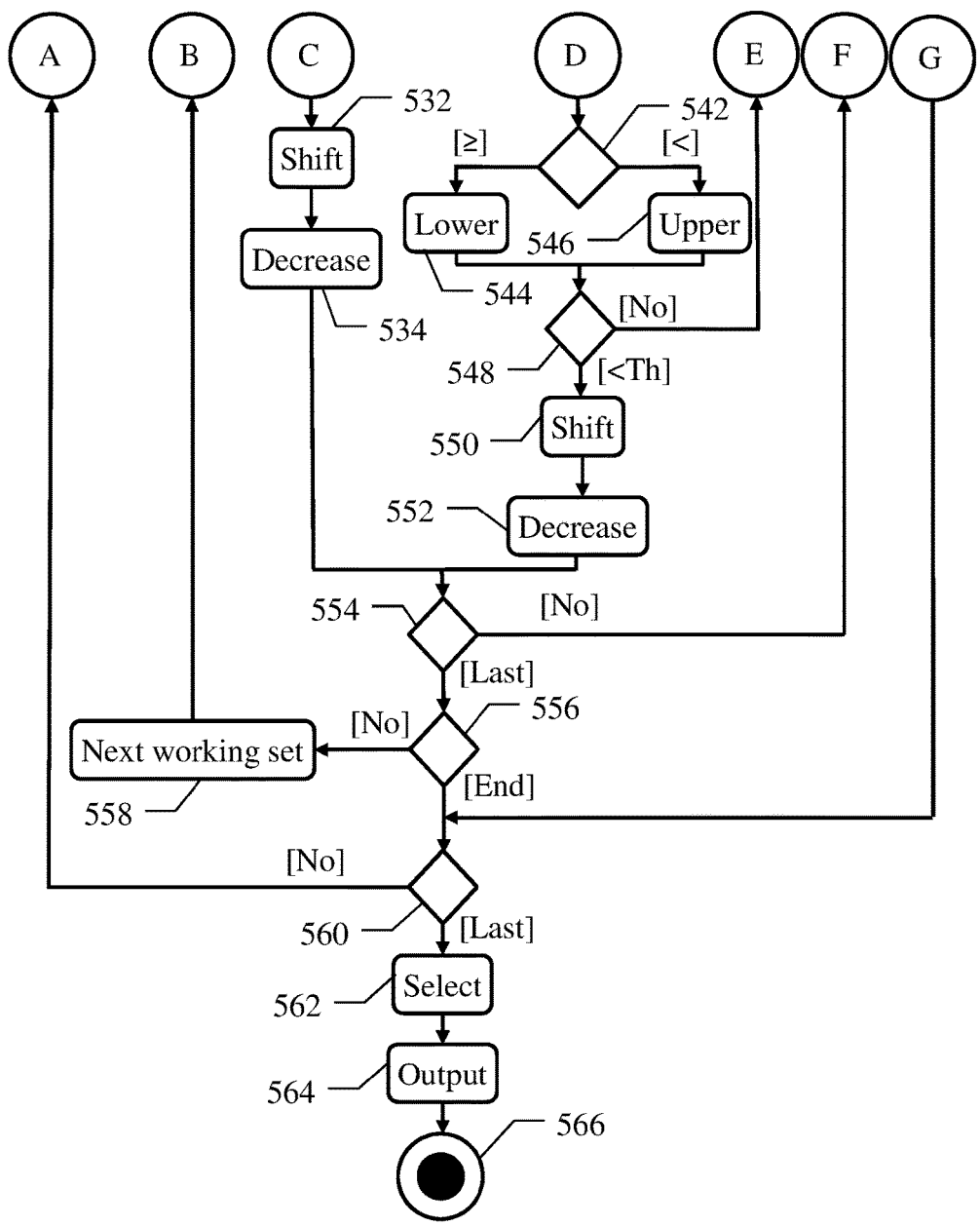

With reference now to FIG. 5A-FIG. 5B, an activity diagram is shown describing the flow of activities relating to an implementation of the solution according to an embodiment of the present disclosure.

Particularly, the diagram represents an exemplary partitioning process (which may be used to assist the operator for partitioning a generic distribution network) with a method 500. In this respect, each block of the diagram may correspond to one or more executable instructions for implementing the specified logical function in the computing system.

The partitioning process begins at the black start circle 502 and then passes to block 504 wherein the generation phase of the partitioning process is performed (for generating the candidate partitions). For example, the generation phase is based on a generation algorithm derived from the general concepts of the k-means algorithm but wherein the users of each part are clustered around multiple poles (instead of a single centroid), as described in the above-mentioned US-A-2015/339412. Briefly, the generator retrieves the network model (from the network model repository) and selects a set of (initial) users from it, in a number equal to the desired number of parts of each (candidate) partition (retrieved from the partitioning parameter repository); for each initial user, the generator assigns all the poles of a corresponding part thereto. An assign operation is then performed, wherein the generator assigns each user to the part of the closest pole. For this purpose, the generator calculates a distance between each pair of adjacent users as the weighted sum of a length term (proportional to a dimensionless value depending on the length of the corresponding pipe) and an elevation term (proportional to a dimensionless value depending on the absolute value of the difference between the corresponding elevations). The generator then calculates the distance of each user from each pole as the shortest path between them that minimizes the sum of the distances between the corresponding pairs of adjacent users. Moreover, the generator adjusts the distance of each user from each pole by adding an adjustment term (proportional to a dimensionless value depending on the absolute value of the difference between the corresponding elevations); the generator further scales the distance of each user from each pole according to a scaling factor of the part of the pole (initialized at the beginning of each iteration of the generation algorithm to a neutral value that leaves the distance unchanged). At this point, the generator calculates a global (load) off-balance of the (current) partition (as a dimensionless value depending on the loads of the parts, in turn based on the demands of its users). If the global off-balance is higher than an off-balance threshold, the generator corrects the partition by moving the users to the least loaded part, but maintaining this part the least loaded one. For this purpose, the generator calculates a (new) scaling factor of each part according to a local (load) off-balance of the part (defined as above only on the basis of the loads of its users) so as to reduce and increase the distances of each user from the poles of the part when the part is under-loaded or over-loaded, respectively, according to a scaling weight that is updated incrementally so as to increase the scaling. The generator then repeats the assignment of each node to the part of the closest pole with this scaling factor, until the least loaded part of the current partition is not the same (or the global off-balance becomes lower than the off-balance threshold or the scaling may not be further incremented). At this point, the generator calculates a global objective function to be optimized as the sum or the maximum of the distances (as adjusted but not scaled) of each user from the closest pole of its part. If no convergence condition is satisfied (for example, when the objective function is still progressing towards a local minimum, is not diverging from the local minimum, is not steady at the local minimum or is not oscillating around the local minimum), the generator performs a move operation wherein the poles of each part are moved to new positions which depend on the users assigned to the part. For this purpose, in each part the generator calculates a local objective function for each possible combination of the poles of the part (possibly reduced according to a sampling factor) in the same way as above but only for the users of the part. The generator then repeats the assign operation and possibly the move operation on the (new) partition so obtained. As soon as at least one of the convergence conditions is satisfied, the generator verifies the partition against one or more approval conditions (for example, to determine whether none of the parts has disconnected nodes or the global off-balance of the partition is within the off-balance threshold). If all the approval conditions are satisfied, the generator accepts this partition and it saves its representation into the candidate partition repository.

Continuing to block 506, the configuration phase of the partitioning process is performed (for configuring each partition by interconnecting its parts). For example, the calculator updates the network model of the distribution network (in the network model repository) by adding a (hydraulic) head of each source (calculated from its pressure and elevation), a (hydraulic) resistance of each pipe (calculated from its diameter, length and roughness) and the resistance between each pair of non-adjacent elements, i.e., users or sources (calculated as the shortest path between them that minimizes the sum of the resistances between the corresponding pairs of adjacent elements); moreover, when the capacities of the sources are not known, the simulator estimates them (and updates the network model accordingly) by running a full-day simulation of the network model and then setting the capacity of each source to its outflow at a peak time (when a total outflow of all the sources is maximum). At this point, for each (current) partition the configurator retrieves its definition (from the candidate partition repository) and initializes the (inter-part) pipes connecting each pair of its adjacent parts to a closed condition; moreover, for each part the configurator calculates a minimum supply elevation required to supply all its users (from their elevations) and a minimum supply head required to supply all its users (from their minimum service pressure and elevation). The configurator now creates a set of (initial) groups; for this purpose, a group is defined for each source (comprising the source and every part that is directly supplied by it) and the groups that share a same source or a same part are merged (to make them disjoint). The configurator calculates a total demand of each part (from the demands of its users, possibly increased according to an estimated, maximum or average, loss of the network), a total demand of each group (from the total demands of its parts) and a total capacity of each group (from the capacities of its sources). The configurator then uses the total capacity of each group to satisfy (totally or partially) the demand of its parts. For this purpose, in each group the configurator estimates a flow at the peak time across each inter-part pipe thereof (by running a simulation of the corresponding portion of the network model). For each part of the group the configurator sets an estimated supply to a total inflow of its inter-part pipes and calculates a residual demand (from its total demand and estimated supply); likewise, the configurator calculates a supply balance of each group (from its total capacity and total demand).

The configurator selects an over supplied group (having a residual capacity defined by an excess of its supply balance) that may be expanded to supply some adjacent parts thereof (according to the highest head of the sources of the group and the minimum supply head of the adjacent parts) in decreasing order of the residual capacity. The configurator distributes the residual capacity of this (expanding) group to its sources by a hydraulic simulation. For this purpose, the configurator calculates a velocity of the water in each inter-part pipe of the expanding group (from its section and from its flow obtained in the previous simulation). If the velocity of one or more (stressed) inter-part pipes is higher than an acceptable velocity threshold, the configurator runs a further simulation of the same portion of the network model corresponding to the expanding group for each inter-part pipe (between the same parts of the most stressed inter-part pipe) with this inter-part pipe in the open condition and then calculates the (new) velocity of the most stressed inter-part pipe; the configurator sets the (relieving) inter-part pipe providing the highest reduction of the velocity of the most stressed inter-part pipe to the open condition. Once all the velocities have become lower than the velocity threshold, the configurator calculates the outflow of each source of the expanding group (from the flows of the corresponding pipes) and its residual capacity (from its capacity and outflow).

At this point, the configurator selects an under supplied part adjacent to the expanding group (having the residual demand still to be satisfied) in decreasing order of a matching of the residual demand with the residual capacity of the expanding group. For this purpose, for each (candidate) pair formed by a source of the expanding group and each adjacent part thereof the configurator calculates a merit index based on a capacity merit factor (increasing with a matching between the residual capacity of the source and the residual demand of the adjacent part) and a head merit factor (increasing with a matching between the head of the source and the minimum supply head of the adjacent part). The configurator selects the adjacent part of the (matching) pair having the highest merit index for addition to the expanding group. The configurator then sets the inter-part pipe between the expanding group and this (adding) part in the lowest resistance path from the (transferring) source of the matching pair to the adding part to the open condition; moreover, the configurator merges the adding part and its possible group into the expanding group, and it updates the supply balance of the (merged) group so obtained according to the (negative) supply balance of the group of the adding part. As above, the configurator determines the (new) estimated supply and residual demand of each part of the merged group.

The same operations are repeated until all the parts belong to one and the same (single) group. At this point, the configurator verifies the group to ensure that it is acceptable from a hydraulic point of view. For this purpose, as above the configurator estimates the flow across each inter-part pipe and the supply pressure of each user at the peak time (by running a simulation of the network model with the inter-part pipes in the open/closed conditions determined above), and it calculates the velocity of the water in each inter-part pipe (from its section and flow). If the velocity of one or more (stressed) inter-part pipes is higher than the same velocity threshold, the configurator runs a further simulation of the same network model for each inter-part pipe (between the same parts of the most stressed inter-part pipe) with this inter-part pipe in the open condition and then calculates the (new) velocity of the most stressed inter-part pipe; the configurator sets the (relieving) inter-part pipe providing the highest reduction of the velocity of the most stressed inter-part pipe to the open condition. Once all the velocities have become lower than the velocity threshold, if the lowest supply pressure of the users of one or more (deficient) parts is lower than the corresponding minimum service pressure, the configurator runs a further simulation of the same network model for each inter-part pipe (between the part of the most deficient part and any adjacent part thereof) with this inter-part pipe in the open condition and then calculates the (new) lowest supply pressure of the most deficient part; the configurator sets the (improving) inter-part pipe providing the highest increment of the lowest supply pressure of the most deficient part to the open condition. Once the supply pressure of all the users has become at least equal to the corresponding minimum service pressure, the configurator accepts the configuration so obtained of the partition by arranging an intercepting valve at each inter-part pipe in the closed condition and a regulating valve at each inter-part pipe in the open condition, and it saves its representation into the candidate partition repository.

At this point, the optimization phase of the partitioning process is performed (for determining the settings of the regulating valves of each candidate partition). For this purpose, a loop is performed for processing the (candidate) partitions. The loop begins at block 508, wherein the optimizer retrieves the definition of a (current) partition (from the candidate partition repository), starting from a first one in any arbitrary order.

Continuing to block 510, the sorter tries to sort the parts of the partition by determining its topological sort, or ordering (for example, with the Kahn's algorithm), wherein its parts are arranged in a sequence so that for every regulating valve the corresponding inflow part precedes the corresponding outflow part in the sequence (from the parts that have no inflow regulating valves down to the parts that have no outflow regulating valves). The flow of activity branches at block 512 according to a result of the sorting of the partition. Particularly, if the sorting has failed (because the regulating valves do not define a strict partial order relation among the parts) the sorter discards the partition at block 514. Indeed, the sorting fails in a pathological condition wherein one or more cycles are created in the corresponding graph (for example, when a part comprises a first and a second subsets that are loosely coupled between them, with the first subset receiving the water from another part that transfers the water to the second subset, which in turns transfers the water to the same other part); however, in most practical situations (and particularly when the partitions are generated and configured as described above) it may be assumed that another corresponding partition without any cycle is available.

Referring back to the block 512, the flow of activity instead descends into block 516 when the parts of the candidate partition have been correctly sorted; at this point, the optimizer determines the first version of the working subset (defined by the parts having no outflow regulating valve) by traversing the sequence of the parts from its bottom.

The optimizer now determines the setting of each inflow regulating valve of the working subset. For this purpose, at first the optimizer initializes the setting of each inflow regulating valve. Particularly, if it is not already available, the simulator at block 518 determines an estimated flow at the peak time across the pipe of each inflow regulating valve with all the inflow regulating valves of the part in the open condition, by running a simulation of the corresponding network model; the optimizer then calculates an estimated velocity of the water in each pipe $$(v = \frac{Q}{\pi r^2},$$

wherein v is the velocity, Q is the flow and $\pi r^2$ is the section) and then its estimated pressure $$(P = \frac{1}{2}\rho v^2,$$

wherein is the pressure and $\rho$ is the density of the water). The optimizer at block 520 then initializes a pressure of the water that is transferred by the inflow regulating valve to its estimated pressure.

At this point, a loop is performed for processing each part of the working subset. The loop begins at block 522, wherein the optimizer takes a (current) part of the working subset into account (starting from a first one in any arbitrary order). The flow of activity then branches at block 524 according to a type of the part. Particularly, in a simplified context the part may be lossless (i.e., the inevitable (pressure) losses within it are negligible in practice so that they are omitted in the corresponding portion of the network model); in this case, the settings of the inflow regulating valve(s) of the (lossless) part is calculated directly. For this purpose, if it is not already available, the optimizer at block 526 determines an estimated pressure of the water that is supplied to each user of the part at the peak time with all the inflow regulating valves of the part in the open condition (resulting from the same simulation used to initialize the settings of the inflow regulating valves). Continuing to block 528, the optimizer calculates an extra pressure of each user of the part as a difference between its estimated pressure and its minimum service pressure (which extra pressure is always positive, or at most equal to zero, when the partition has been correctly generated and configured, for example, as described above).

The optimizer at block 530 identifies a least over supplied user of the part that has the lowest value of the extra pressure. Continuing to block 532, the optimizer sets a pressure shift for all the inflow regulating valves of the part equal to the extra pressure of the least over supplied user. The optimizer at block 534 then calculates the setting of each inflow regulating valve of the part by simply decrementing its initial value by the pressure shift; the optimizer then adds the settings of the inflow regulating valves of the part to the network model (in the candidate partition repository).

This pressure shift ensures that the pressure of the water delivered by the inflow regulating valves to the part is decremented as far as possible but remaining compatible with the minimum service pressure of all its users; moreover, the application of the same pressure shift to all the inflow regulating valves provides a uniform shift of the pressure of the water in the whole part. In this way, the optimization of the settings of the inflow regulating valves is dramatically simplified.

With reference again to the block 524, in most practical situations the part is instead lossy (i.e., it has some losses that may not be disregarded and are then represented accordingly in the corresponding portion of the network model, for example, by reduction factors of the pressure along its pipes); in this case, the settings of the inflow regulating valve(s) of the (lossy) part is determined with a dichotomic (binary) search (since any change of the settings of the inflow regulating valves induces a change in the losses that is not uniform and then perturbs the distribution of the water in the part). For this purpose, the optimizer at block 536 initializes a lower-bound value and a higher-bound value (defining a searching range for the same pressure shift to be applied to all the inflow regulating valves of the part) to zero and to the lowest initial value of its inflow regulating valves, respectively. The optimizer at block 538 then calculates a candidate value of the pressure shift as the average of its lower-bound value and higher-bound value. With reference now to block 540, the simulator determines a (further) estimated pressure of the water supplied to each user of the part at the peak time by running a (further) simulation of the corresponding portion of the network model, with the setting of each inflow regulating valve of the part now equal to its initial value decremented by the candidate value of the pressure shift. A test is then made at block 542, wherein the optimizer compares the estimate pressure of each user of the part against its minimum service pressure. If the estimate pressure of all the users of the part is higher than or equal to the corresponding minimum service pressure, the optimizer at block 544 updates the lower-bound value of the searching range to the candidate value of the pressure shift (since the pressure of the water delivered by the inflow regulating valves to the part may be further decremented remaining compatible with the minimum service pressure of all its users). Conversely, if the estimated pressure of one or more of the users of the part is lower than the corresponding minimum service pressure, the optimizer at block 546 updates the upper-bound value of the searching range to the candidate value of the pressure shift (since the pressure of the water delivered by the inflow regulating valves to the part has been reduced excessively becoming incompatible with the minimum service pressure of some of its users). In both cases, the flow of activity merges again at block 548 from either the block 544 or the block 546; at this point, the optimizer verifies a convergence condition defined by a (pressure) difference between the (new) higher-bound value and lower-bound value of the searching range falling below a convergence threshold (for example, equal to 1-5% of the initial upper-bound value). If the convergence condition is not satisfied, i.e., the difference is (possibly strictly) higher than the convergence threshold, the process returns to the block 538 to continue the binary search in the (new) searching range (being halved with respect to its previous version). Conversely, as soon as the convergence condition is satisfied the binary search is terminated by descending into block 550. At this point, the optimizer sets the pressure shift (for all the inflow regulating valves of the part) equal to the lower-bound value of the searching range. The optimizer at block 552 then determines the setting of each inflow regulating valve of the part by decrementing its initial value by the pressure shift; the optimizer then adds the setting of the regulating valves of the part to the network model (in the candidate partition repository).

When the part has a single inflow regulating valve, this pressure shift ensures that the pressure of the water delivered by the inflow regulating valve to the part is decremented as far as possible but remaining compatible with the minimum service pressure of all its users (with a gap at most equal to the convergence threshold). Instead, when the part has multiple inflow regulating parts, the settings of its inflow regulating valves (compatible with the minimum service pressure of all its users) are selected only among a subset of their possible values that are obtained by applying the same pressure shift to all of them. This significantly simplifies the optimization of the settings of the inflow regulating valves in this case as well. However, now it is not possible to exclude that the pressure of the water transferred by some inflow regulating valves to the part may be further decremented (apart for the gap of the convergence threshold) still remaining compatible with the minimum service pressure of all its users (since all the other values are lost of the settings of the inflow regulating valves corresponding to the possible combinations of different individual values of the pressure shift). However, with the above-mentioned simplification the pressures of the water delivered by the inflow regulating valves maintain the same proportions as at their initial values; therefore, the settings of the inflow regulating valves should not perturb the corresponding outflow parts. In any case, experimental results have demonstrated that the proposed approach provides satisfactory results in practice.

The flow of activity merges again at block 554 after processing the part from either the block 534 (lossless part) or from the block 552 (lossy part). At this point, the optimizer verifies whether all the parts of the working subset have been processed. If not, the process returns to the block 522 to repeat the same operations for a next part Conversely, once all the parts have been processed the loop is exit by descending into block 556.

At this point, the optimizer verifies whether the settings of all the inflow regulating valves have been determined. If not, the optimizer at block 558 identifies the next version of the working subset (defined by one or more of the parts comprised in no previous version of the working subset and having no outflow regulating valve whose setting is still to be determined) by traversing the sequence of the parts backwards. The process then returns to the block 518 to repeat the same operations on this version of the working subset (so as to determine the settings of its inflow regulating valves).

Conversely, once the settings of all the regulating valves have been determined (after the last version of the working subset has been reached at a top of the sequence of the parts), the process descends into block 560; the same point is also reached directly from the block 514 when the partition has been discarded (since it comprises one or more cycles). At this point, the optimizer verifies whether all the partitions of the distribution network have been processed. If not, the flow of activity returns to the block 508 to repeat the same operations for optimizing a next partition.

Conversely, once all the partitions have been optimized, the flow of activity descends into block 562, wherein the selector selects one of the (candidate) partitions according to one or more selection criteria; for example, the selection criteria may be based on a cost in terms of the required intercepting/regulating valves, on an estimated reduction of the losses, on a possible return in terms of energy that may be generated by the turbines and/or on a reduction of hydraulic reliability (for example, as described in "Optimal design of district metered areas in water distribution networks, Francesco De Paola, Nicola Fontana, Enzo Galdiero, Maurizio Giugni, Gianluca Sorgenti degli Uberti and Marcello Vitaletti, 12th International Conference on Computing and Control for the Water Industry, CCWI2013"). Continuing to block 564, the displayer retrieves the definition of the selected partition (from the selected partition repository) and outputs a corresponding representation thereof (for example, as a print-out on the printer), so as to cause the operator to order the partition of the distribution network accordingly (for example, with the distribution network that is actually partitioned by one or more teams of workers). The process then ends at the concentric white/black stop circles 566.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relation (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for configuring a distribution network of a commodity. However, the distribution network may be of any type (for example, public, private) and it may be used to distribute any commodity (for example, gas, electricity).

In an embodiment, the method comprises providing a representation of a partition of the distribution network from a storage device of a computing system. However, the representation of the partition may be provided in any way, either generated in the computing system or received from the outside in any way (for example, read from a removable storage device or downloaded from a network); moreover, the representation of the partition may be provided from any storage device (for example, loaded in the working memory from the mass memory or directly therein). In any case, the same method may be applied to the three-step partitioning process described above, to any other partitioning process or even to a single partition of the distribution network.

In an embodiment, the partition is defined by a plurality of disjoint parts; each part comprises a plurality of interconnected sources and/or users of the commodity. However, the parts may be in any number and they may comprise any number and type of sources (for example, reservoirs, gasometers, power stations), any number and type of users (for example, fire hydrants, commercial establishments, plants) or any combination thereof.

In an embodiment, the partition is defined by a plurality of regulating elements each one for regulating a transfer of the commodity from an outflow one of the parts to an inflow one of the parts (with the regulating element that is an outflow regulating element for the outflow part and an inflow regulating element for the inflow part). However, the regulating elements may be in any number and of any type (for example, only control valves, only turbines or any combination thereof), and they may be used to regulate the transfer of the commodity in any way (for example, its flow, pressure).

In an embodiment, the method comprises identifying a first version of a working subset of the parts by the computing system; the first version of the working subset is defined by one or more of the parts having no outflow regulating element. However, the first version of the working subset may be identified in any way (for example, by sorting the parts with the Tarjan's algorithm or simply by searching them).

In an embodiment, the method comprises an iteration implemented by repeating the following steps by the computing system.

In an embodiment, the iteration comprises determining a setting of each inflow regulating element of the working subset according to at least one optimization criterion. However, the settings of the inflow regulating elements may be determined in any way (for example, with a neural network) according to any number and type of optimization criteria (for example, to guarantee a safety margin of the pressure of the water that is supplied to each user, to minimize losses).

In an embodiment, the iteration comprises identifying a next version of the working subset; the next version of the working subset is defined by one or more of the parts being comprised in no previous version of the working subset and having no outflow regulating element whose setting is still to be determined. However, each next version of the working subset may be identified in any way (for example, according to the same sorting of the parts as above or again simply by searching them).

In an embodiment, the above-mentioned steps of the iteration are repeated until the settings of all the regulating elements have been determined. However, the iteration may be implemented in any way (for example, with a pre-test or a post-test loop) and the corresponding exit condition may be verified in any way (for example, by monitoring either the settings of the regulating elements or the working subset).

In an embodiment, the method comprises outputting an indication of the settings of the regulating elements on an output device of the computing system for configuring the distribution network. However, the settings of the regulating elements may be indicated in any way (for example, in a tabular or graphical way) and it may be output on any device, either locally or remotely (for example, a monitor, a printer, a tablet); moreover, this information may be used in any way to configure the distribution network accordingly (for example, directly or after a manual verification).

In an embodiment, said step of determining the setting of each inflow regulating element of the working subset comprises the following operations for each one of the parts of the working subset.

In an embodiment, the setting of each inflow regulating element of the part is initialized. However, the settings of the inflow regulating elements may be initialized in any way (for example, starting from zero and then increasing then); in any case, the possibility is not excluded of determining the settings of the inflow regulating elements directly (instead of initializing and then updating them).

In an embodiment, a shift value for the part is determined according to said at least one optimization criterion. However, alternative implementations are feasible wherein a corresponding shift value is determined for each inflow regulating element, or more generally the settings of the inflow regulating elements are determined independently.

In an embodiment, the setting of each inflow regulating element of the part is updated according to the shift value. However, the settings of the inflow regulating elements may be updated in any way (for example, by increasing them, distributing the shift value among the inflow regulating elements, such as proportionally to their initial values).

In an embodiment, said initializing the setting of each inflow regulating element of the part comprises determining an estimated transfer of the commodity across each inflow regulating element of the part with each inflow regulating element of the part in an open condition. However, the estimated transfers may be defined by any number and type of parameters (for example, flow, pressure); moreover, the estimated transfers may be determined in any way (for example, by a simulation for each part, for each working subset or for the whole distribution network, by a measure on the distribution network still to be partitioned) and with reference to any condition (for example, at a peak time of each inflow regulating element, of each part, of the whole working subset or distribution network, as average values).

In an embodiment, the setting of each inflow regulating element of the part is initialized according to the corresponding estimated transfer. However, the settings of the inflow regulating elements may be initialized in any way (for example, by adding a correction value to the corresponding estimated transfers).

In an embodiment, said determining a shift value for the part comprises the following operations when the part has no significant loss of the commodity therein. However, the loss of the part may be defined in any way (for example, by leakages of the water) and it may be considered not significant at any maximum or average level (for example, when it is negligible since lower than a predefined threshold, for example, 0.5-2% of a corresponding total supply of the part).

In an embodiment, an estimated supply of each user of the part is determined with each inflow regulating element of the part in the open condition. However, the estimated supplies may be defined and determined in any way (either the same or different with respect to the determination of the estimated transfers).

In an embodiment, an extra supply of each user of the part is calculated according to a difference between the estimated supply and a required supply of the user. However, the required supply may be defined by any number and type of parameters (for example, maximum or average pressure) and the extra supply may be calculated in any way (for example, as a minimum or average value).

In an embodiment, a least over supplied one of the users of the part is identified according to the corresponding extra supplies. However, the least over supplied user may be identified in any way (for example, as the user having the lowest value of the extra supply at the peak time or for the longest period).

In an embodiment, the shift value is set according to the extra supply of the least over supplied user. However, the shift value may be set in any way (for example, by detracting a safety margin, such as equal to 1-5% thereof).

In an embodiment, said step of determining a shift value for the part comprises the following operations when the part has a significant loss of the commodity therein. However, the possibility is not excluded of determining the settings of all the inflow regulating elements in the same way (for example, by always applying the procedure of the lossy parts, including for the lossless parts as well).

In an embodiment, the shift value is initialized. However, the shift value may be initialized in any way (for example, starting from zero and then increasing it).

In an embodiment, an iteration is implemented by repeating the following steps.

In an embodiment, the iteration comprises determining a further estimated supply of the commodity to each user of the part according to a simulation of a corresponding portion of the distribution network with the setting of each inflow regulating element of the part updated according to the shift value. However, the further estimated supplies may be determined in any way (either the same or different with respect to the determination of the estimated transfers and/or the estimated supplies).

In an embodiment, the iteration comprises updating the shift value according to a comparison of the further estimated supply with a required supply of each user of the part. However, the required supply may be defined in any way (see above) and it may be compared with the further estimated supply in any way (for example, according to their average values over a predefined period); moreover, the shift value may be updated in any way (for example, increasing or decreasing it by a fixed pitch).

In an embodiment, the above-mentioned steps of the iteration are repeated until a convergence condition based is satisfied. However, the iteration may be implemented in any way (for example, with a pre-test or a post-test loop); moreover, the convergence condition may be defined in any way (for example, when one or more parameters or any combinations thereof reach a threshold defined in absolute or relative terms) and it may be verified in any way (for example, when it is satisfied for at least one or all of the inflow regulating elements of the part in one or more consecutive iterations).

In an embodiment, said determining a shift value for the part comprises performing a binary search of the shift value. However, the shift value may be searched in any other way (for example, with a linear or sequential algorithm).

In an embodiment, said step of performing a binary search comprises initializing a searching range for the binary search according to the estimated transfers of one or more inflow regulating elements of the part. However, the searching range may be defined in any way (i.e., only lower bounded, only upper bounded or both of them) and it may be initialized in any way according to any estimated value (for example, starting from its lower-bound value equal to the extra supply of the least over supplied user of the part) or even independently of any condition of the part (for example, by predefined values).

In an embodiment, said step of initializing a searching range comprises initializing an upper-bound value of the searching range according to a lowest one of the estimated transfers of the inflow regulating elements of the part. However, the upper-bound value may be initialized in any way (for example, to a multiple of the lowest estimated transfer, such as 1.5-2.0 times it, to the lowest estimated transfer incremented by a fixed value, such as 0.8-1.5 MPa).

In an embodiment, said step of receiving a representation of the distribution network comprises verifying whether the distribution network comprises at least one cycle of the regulating elements. However, the cycles may be identified in any way (for example, manually).

In an embodiment, said step of receiving a representation of the distribution network comprises discarding the partition in response to said at least one cycle. However, any other action may be performed in response to the detection of each cycle (for example, removing the cycle by splitting a part belonging thereto into two new parts with the addition of a new regulating element, or more, at a corresponding interconnection between them having a high resistance).

In an embodiment, said step of providing a representation of a partition of the distribution network comprises providing the representation of a configured version of the partition by the computing system. Said step of providing the representation of a configured version of the partition comprises providing a representation of a non-configured version of the partition in the storage device (the non-configured version of the partition being defined by the parts each one comprising one or more interconnected users with each interconnection of the distribution network between different parts being set to a closed condition) and configuring the non-configured version of the partition into the configured version of the partition. Said step of configuring the non-configured version of the partition comprises initializing a grouping at least partial of the sources and of the parts into a plurality of disjoint groups (each one comprising one or more interconnected sources and parts) and an iteration implemented by repeating the following steps. The iteration comprises selecting an enlarging group among the groups being over supplied by having a residual capacity indicative of an excess of a supply balance thereof based on a difference between a total capacity of the corresponding sources and a total demand of the corresponding users (the enlarging group being selected in decreasing order of the residual capacity of the over supplied groups), selecting an adding part among the parts adjacent to the enlarging group being under supplied by having a non-zero residual demand based on a difference between the total demand of the corresponding users and a total supply of the corresponding sources (the adding part being selected in decreasing order of a matching of the residual demand of the under supplied parts with the residual capacity of the expanding group) and merging the adding part and the possible group thereof into the enlarging group by setting at least one interconnection between the adding part and the expanding group to an open condition;

the above-mentioned steps of the iteration are repeated until all the parts belong to a single group. Said step of configuring the non-configured version of the partition then comprises associating an intercepting element with each interconnection in the closed condition and one of the regulating elements with each interconnection in the open condition. Said step of providing the representation of a configured version of the partition then comprises saving the representation of the configured version of the partition into the storage device. However, the partition may be configured in any way (for example, with a heuristic technique as described in the above-mentioned document by De Paola et al.); in any case, the representation of the configured version of the partition may be provided in any way, either generated in the computing system or received from the outside in any way (for example, read from a removable storage device or downloaded from a network).

In an embodiment, said step of providing a representation of a non-configured version of the partition comprises generating the non-configured version of the partition by the computing system. Said step of generating the non-configured version of the partition comprises providing a representation of the distribution network in the storage device, initializing a plurality of poles for each one of a selected number of the parts (each pole being initialized to one of the users of the distribution network) and an iteration implemented by repeating the following steps. The iteration comprises assigning each other user of the distribution network to the part with the pole having a shortest distance from the user according to a predefined metric and moving the poles of each part to distinct users of the part according to a local objective function based on the distances of the other users of the part from the poles; the above-mentioned steps of the iteration are repeated until a further convergence condition is satisfied. Said step of generating the non-configured version of the partition then comprises saving the representation of the non-configured version of the partition into the storage device. However, the partition may be generated in any way (for example, with a standard k-mean algorithm); in any case, the representation of the non-configured version of the partition may be provided in any way, either generated in the computing system or received from the outside in any way (for example, read from a removable storage device or downloaded from a network).

In an embodiment, the distribution network is a water distribution network. However, the distribution network may be used to distribute any type of water (for example, fresh water).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions executable by a computing system to cause the computing system to perform the same method. However, the computer program may be implemented as a stand-alone module, as a plug-in for a pre-existing software application (for example, the partitioner), or even directly in the latter.

In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a system comprising means configured for performing the same method. An embodiment provides a system comprising a circuitry (i.e., any hardware suitably configured, for example, by software) for performing each step of the same method; particularly, an embodiment provides a system for configuring a distribution network of a commodity, the system comprising a circuitry for providing a representation of a partition of the distribution network (the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part), a circuitry for identifying a first version of a working subset of the parts (the first version of the working subset being defined by one or more of the parts having no outflow regulating element), a circuitry for repeating determining a setting of each inflow regulating element of the working subset according to at least one optimization criterion and identifying a next version of the working subset (the next version of the working subset being defined by one or more of the parts being comprised in no previous version of the working subset and having no outflow regulating element whose setting is still to be determined) until the settings of all the regulating elements have been determined, and a circuitry for outputting an indication of the settings of the regulating elements for configuring the distribution network.

However, the method may also be carried out on a system based on a different architecture (for example, a local, wide area, global, cellular or satellite network), and exploiting any type of (wired and/or wireless) connections. It would be readily apparent that it is also possible to deploy the same solution as a service that is accessed through a network (such as in the Internet).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The above-described features may be combined in any way. For example, possible combinations are claim 2 with claim 1, claim 3 with claim 1, claim 4 with claim 2 or 3, claim 5 with any claim from 2 to 4, claim 6 with claim 5, claim 7 with claim 6 when dependent on claim 3, claim 8 with claim 7, claim 9 with any claim from 1 to 8, claim 10 with any claim from 1 to 9, claim 11 with claim 10, claim 12 with any claim from 1 to 11, claim 13 with instructions for performing the method of any claim from 1 to 12 and claim 14 with circuitry for performing the steps of any claim from 1 to 12.

What is claimed is:

1. A method for configuring a distribution network of a commodity, the method comprising:
providing a representation of a partition of the distribution network from a storage device of a computing system, the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part;

identifying a first version of a working subset of the parts by the computing system, the first version of the working subset being defined by one or more of the parts having no outflow regulating element;

repeating, by the computing system, steps of:
   determining a setting of each inflow regulating element of the working subset according to at least one optimization criterion; and
   identifying a next version of the working subset, the next version of the working subset being defined by one or more of the parts being comprised in no previous version of the working subset and having no outflow regulating element whose setting is still to be determined;

until the settings of all the regulating elements have been determined; and outputting an indication of the settings of the regulating elements on an output device of the computing system for configuring the distribution network;

wherein said receiving a representation of the distribution network comprises:
   verifying whether the distribution network comprises at least one cycle of the regulating elements; and
   discarding the partition in response to said at least one cycle.

2. The method according to claim 1, wherein said determining the setting of each inflow regulating element of the working subset comprises, for each one of the parts of the working subset:
   initializing the setting of each inflow regulating element of the part;
   determining a shift value for the part according to said at least one optimization criterion; and
   updating the setting of each inflow regulating element of the part according to the shift value.

3. The method according to claim 2, wherein said initializing the setting of each inflow regulating element of the part comprises:
   determining an estimated transfer of the commodity across each inflow regulating element of the part with each inflow regulating element of the part in an open condition; and
   initializing the setting of each inflow regulating element of the part according to the corresponding estimated transfer.

4. The method according to claim 2, wherein said determining a shift value for the part comprises, when the part has no significant loss of the commodity therein:
   determining an estimated supply of each user of the part with each inflow regulating element of the part in the open condition;
   calculating an extra supply of each user of the part according to a difference between the estimated supply and a required supply of the user;
   identifying a least over supplied one of the users of the part according to the corresponding extra supplies; and
   setting the shift value according to the extra supply of the least over supplied user.

5. The method according to claim 2, wherein said determining a shift value for the part comprises, when the part has a significant loss of the commodity therein:
   initializing the shift value;
   repeating steps of:
      determining a further estimated supply of the commodity to each user of the part according to a simulation of a corresponding portion of the distribution network with the setting of each inflow regulating element of the part updated according to the shift value; and
      updating the shift value according to a comparison of the further estimated supply with a required supply of each user of the part;
   until a convergence condition is satisfied.

6. The method according to claim 5, wherein said determining a shift value for the part comprises:
   performing a binary search of the shift value.

7. A method for configuring a distribution network of a commodity, the method comprising:
   providing a representation of a partition of the distribution network from a storage device of a computing system, the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part;
   identifying a first version of a working subset of the parts by the computing system, the first version of the working subset being defined by one or more of the parts having no outflow regulating element;
   repeating, by the computing system, steps of:
      determining a setting of each inflow regulating element of the working subset according to at least one optimization criterion; and
      identifying a next version of the working subset, the next version of the working subset being defined by one or more of the parts being comprised in no previous version of the working subset and having no outflow regulating element whose setting is still to be determined;
   until the settings of all the regulating elements have been determined; and
   outputting an indication of the settings of the regulating elements on an output device of the computing system for configuring the distribution network;
   wherein said determining the setting of each inflow regulating element of the working subset comprises, for each one of the parts of the working subset:
      initializing the setting of each inflow regulating element of the part;
      determining a shift value for the part according to said at least one optimization criterion; and
      updating the setting of each inflow regulating element of the part according to the shift value;
   wherein said determining a shift value for the part comprises, when the part has a significant loss of the commodity therein:
      initializing the shift value;
      repeating steps of:
         determining a further estimated supply of the commodity to each user of the part according to a simulation of a corresponding portion of the distribution network with the setting of each inflow regulating element of the part updated according to the shift value; and updating the shift value according to a comparison of the further estimated supply with a required supply of each user of the part;

until a convergence condition is satisfied;

wherein said determining a shift value for the part comprises:

performing a binary search of the shift value;

wherein said initializing the setting of each inflow regulating element of the part comprises:

determining an estimated transfer of the commodity across each inflow regulating element of the part with each inflow regulating element of the part in an open condition; and initializing the setting of each inflow regulating element of the part according to the corresponding estimated transfer; and wherein said performing a binary search comprises:

initializing a searching range for the binary search according to the estimated transfers of one or more regulating elements of the part.

8. The method according to claim 7, wherein said initializing a searching range comprises:

initializing an upper-bound value of the searching range according to a lowest one of the estimated transfers of the inflow regulating elements of the part.

9. A method for configuring a distribution network of a commodity, the method comprising:

providing a representation of a partition of the distribution network from a storage device of a computing system, the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part;

identifying a first version of a working subset of the parts by the computing system, the first version of the working subset being defined by one or more of the parts having no outflow regulating element;

repeating, by the computing system, steps of:

determining a setting of each inflow regulating element of the working subset according to at least one optimization criterion; and identifying a next version of the working subset, the next version of the working subset being defined by one or more of the parts being comprised in no previous version of the working subset and having no outflow regulating element whose setting is still to be determined;

until the settings of all the regulating elements have been determined; and outputting an indication of the settings of the regulating elements on an output device of the computing system for configuring the distribution network;

wherein said providing a representation of a partition of the distribution network comprises providing a representation of a configured version of the partition by the computing system, said providing a representation of a configured version of the partition comprising:

providing a representation of a non-configured version of the partition in the storage device, the non-configured version of the partition being defined by the parts each one comprising one or more interconnected users with each interconnection of the distribution network between different parts being set to a closed condition; and configuring the non-configured version of the partition into the configured version of the partition by:

initializing a grouping at least partial of the sources and of the parts into a plurality of disjoint groups each one comprising one or more interconnected sources and parts;

repeating steps of:

selecting an enlarging group among the groups being over supplied by having a residual capacity indicative of an excess of a supply balance thereof based on a difference between a total capacity of the corresponding sources and a total demand of the corresponding users, the enlarging group being selected in decreasing order of the residual capacity of the over supplied groups;

selecting an adding part among the parts adjacent to the enlarging group being under supplied by having a non-zero residual demand based on a difference between the total demand of the corresponding users and a total supply of the corresponding sources, the adding part being selected in decreasing order of a matching of the residual demand of the under supplied parts with the residual capacity of the expanding group; and merging the adding part and the possible group thereof into the enlarging group by setting at least one interconnection between the adding part and the expanding group to an open condition;

until all the parts belong to a single group; and associating an intercepting element with each interconnection in the closed condition and one of the regulating elements with each interconnection in the open condition; and saving the representation of the configured version of the partition into the storage device.

10. The method according to claim 9, wherein said providing a representation of a non-configured version of the partition comprises generating the non-configured version of the partition by the computing system, said generating the non-configured version of the partition comprising:

providing a representation of the distribution network in the storage device;

initializing a plurality of poles for each one of a selected number of the parts, each pole being initialized to one of the users of the distribution network;

repeating steps of:

assigning each other user of the distribution network to the part with the pole having a shortest distance from the user according to a predefined metric; and moving the poles of each part to distinct users of the part according to a local objective function based on the distances of the other users of the part from the poles;

until a further convergence condition is satisfied; and saving the representation of the non-configured version of the partition into the storage device.

11. The method according to claim 1, wherein the distribution network is a water distribution network.

12. A computer program product, the computer program product comprising a non-transitory computer readable storage medium having program instructions embodied therewith, the program instructions executable by a computing system to cause the computing system to perform a method for configuring a distribution network of a commodity, the method comprising:
- providing a representation of a partition of the distribution network from a storage device of a computing system, the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part;
- identifying a first version of a working subset of the parts by the computing system, the first version of the working subset being defined by one or more of the parts having no outflow regulating element;
- repeating, by the computing system, steps of:
  - determining a setting of each inflow regulating element of the working subset according to at least one optimization criterion; and
  - identifying a next version of the working subset, the next version of the working subset being defined by one or more of the parts being comprised in no previous version of the working subset and having no outflow regulating element whose setting is still to be determined;
  - until the settings of all the regulating elements have been determined; and
- outputting an indication of the settings of the regulating elements on an output device of the computing system for configuring the distribution network;
- wherein said receiving a representation of the distribution network comprises:
  - verifying whether the distribution network comprises at least one cycle of the regulating elements; and
  - discarding the partition in response to said at least one cycle.

13. A system for configuring a distribution network of a commodity, the system comprising:
- a circuitry for providing a representation of a partition of the distribution network, the partition being defined by a plurality of disjoint parts, each one comprising a plurality of interconnected sources and/or users of the commodity, and by a plurality of regulating elements each one for regulating a transfer of the commodity from an outflow one of the parts to an inflow one of the parts, the regulating element being an outflow regulating element for the outflow part and an inflow regulating element for the inflow part;
- a circuitry for identifying a first version of a working subset of the parts, the first version of the working subset being defined by one or more of the parts having no outflow regulating element;
- a circuitry for repeating:
  - determining a setting of each inflow regulating element of the working subset according to at least one optimization criterion; and
  - identifying a next version of the working subset, the next version of the working subset being defined by one or more of the parts being comprised in no previous version of the working subset and having no outflow regulating element whose setting is still to be determined;
  - until the settings of all the regulating elements have been determined; and
- a circuitry for outputting an indication of the settings of the regulating elements for configuring the distribution network;
- wherein said receiving a representation of the distribution network comprises:
  - verifying whether the distribution network comprises at least one cycle of the regulating elements; and
  - discarding the partition in response to said at least one cycle.

* * * * *